United States Patent [19]

Mix, Jr.

[11] 4,305,079

[45] Dec. 8, 1981

[54] MOVABLE INK JET GUTTER

[75] Inventor: Arthur L. Mix, Jr., Boulder, Colo.

[73] Assignee: International Business Machines Corp., Armonk, N.Y.

[21] Appl. No.: 78,252

[22] Filed: Sep. 24, 1979

[51] Int. Cl.[3] .............................................. G01D 15/16

[52] U.S. Cl. .................................. 346/75; 346/140 R

[58] Field of Search .................................. 346/75, 140

[56] References Cited

U.S. PATENT DOCUMENTS

| | | | |
|---|---|---|---|
| 3,839,721 | 10/1974 | Chen | 346/75 |
| 3,945,020 | 3/1976 | Kraus | 346/75 |
| 4,031,561 | 6/1977 | Paranjpe | 346/75 X |
| 4,045,802 | 8/1977 | Fukazawa | 346/75 X |
| 4,160,982 | 7/1979 | Keur | 346/75 |
| 4,238,805 | 12/1980 | Paranjpe | 346/75 |

OTHER PUBLICATIONS

Vesci, A., Flow Reversing Valve for Ink Jet Head, IBM Tech. Disc. Bulletin, vol. 18, No. 12, May 1976, pp. 4138–4139.

Krause, K. A., Ink Jet Head, IBM Tech. Disc. Bulletin, vol. 19, No. 8, Jan. 1977, pp. 3216–3217.

Seitz, H. K., Nozzle Chemical Process, IBM Tech. Disc. Bulletin, vol. 20, No. 2, Jul. 1977, pp. 786–787.

Mix, A. L. Jr., Charge Electrode Alignment and Retraction, IBM TDB, vol. 20, No. 1, Jun. 1977, pp. 33–34.

Hendriks et al., Flying Gutter for Ink Jet Printers, IBM TDB, vol. 22, No. 8A, Jan. 1980, pp. 3286–3287.

*Primary Examiner*—Joseph W. Hartary

*Attorney, Agent, or Firm*—J. G. Cockburn

[57] ABSTRACT

The contamination by ink of an ink jet printing system at start-up and shut-down is eliminated by moving the normal operational gutter from its print position along the flight path of the ink droplets to a position immediately adjacent to the nozzle plate of said head. The charge electrodes and the deflection electrode are moved out of the path of the gutter as it advances towards the nozzle plate.

3 Claims, 8 Drawing Figures

MOVABLE INK JET GUTTER

CROSS-REFERENCE TO OTHER APPLICATION

Patent Application Ser. No. 90,368 Filed Nov. 1, 1979 entitled "Ink Jet Retractable Electrode and Secondary Ink Catcher" discloses an ink jet printing system wherein a thin, movable ink receiving structure called a "probe" is inserted along the flight path of the ink droplets periodically. The probe catches ink as the probe advances from a home position to a position within the vicinity of the nozzle plate.

BACKGROUND OF THE INVENTION

1. Field of the Invention

The present invention relates to ink jet printers. In particular, the invention relates to methods and apparatus for enhancing the reliability of ink jet printer heads.

2. Prior Art

The use of ink jet printers for printing information on recording media is well known in the prior art. Conventional ink jet printers incorporate a plurality of electrical components and fluidic components. The components coact to perform the printing function.

The fluidic components include a drop generator having a chamber for affecting drop inducing vibration on a printing fluid or ink and a nozzle plate with one or more ink nozzles interconnected to the chamber. A gutter assembly is positioned downstream from the nozzle plate in the flight path of ink droplets. The gutter assembly catches ink droplets which are not needed for printing on the recording medium.

In order to create the ink droplets, an electrical transducer within the drop generator vibrates at a frequency which forces the thread-like streams of ink which are initially ejected from the nozzles to be broken up into a series of ink droplets at a point within the vicinity of the nozzle plate. A charge electrode is positioned along the flight path of the ink droplets. The function of the charge electrode is to selectively induce a charge on the ink droplets as said droplets separate from the stream. A pair of deflection plates is positioned downstream from the charge electrodes. The function of the deflection plates is to deflect a charged ink droplet either into the gutter or onto the recording media.

One of the most pressing problems associated with ink jet printers of the above described type is that of head reliability. Most of the head failures occur at the instant when the heads are turned on (that is, stream start-up) or turned off (that is, stream shut-down). It is believed that temporary stream instability is the prime cause of these reliability problems.

The causes for the stream instability are the start-up/shut-down dynamics and contamination associated with the streams. The term start-up/shut-down dynamics is used to describe any form of sputtering, oozing, low velocity or misdirected ink stream. Among other things, these aberrations of the ink stream stem from the presence of air bubbles in the head and slow ink pressure transition within the head at start-up or shut-down. Contamination results in partial or complete blocking of the nozzle hole which results in stream misdirection.

As was stated previously, the ink streams and/or ink droplets are projected through several electrode structures for deflection. The maximum clearance between the electrode structures and the ink stream and/or ink droplets is typically 0.015 inch. With this tight clearance, any sputtering or oozing etc. of the stream results in wetting the electrodes and ultimately electrical shorting.

One method described in the prior art to alleviate the above described problem is the so-called "HARD START" method. This is accomplished with a high performance valve positioned in the nozzle head. The valve causes the pressure transition in the head to occur in sub-millisecond times. This approach largely avoids stream dynamics type failures. However, failures associated with stream blockage (contamination) are not addressed. Also a highly tuned valve is needed which tends to increase the overall cost of the head and additionally this approach places constraints on other drop generator components which tend to limit design freedom. Finally, significant measures must be taken to ensure that no air is allowed to enter the head cavity.

U.S. Pat. No. 3,839,721 discloses a method and apparatus used to prevent ink from drying at the nozzle during printer shut-down and to keep the charging electrode and deflection plates free from ink spraying at pressure shutoff. In addition to the conventional gutter structure associated with an ink jet printer, a second gutter-like structure having a vapor chamber and with an opening having a partially closed lip portion is positioned between the charge electrodes and the deflection electrodes. At shutdown time the charge electrodes are moved up out of the path of the jet streams and the second gutter-like structure is moved into the jet streams along a path transverse to the flight path of the droplets of the jet stream. In this position, ink issuing from the nozzle is caught by the gutter.

Although this prior art is a satisfactory approach for its intended purpose, one of its shortcomings is that splashing of ink is not completely eliminated since the closed lip portion of the gutter-like structure crosses the flight path of active ink streams.

U.S. Pat. No. 4,031,561 discloses another technique used in the prior art to solve the start-up and/or shut-down problem. According to the teachings of the patent, at start-up time, the charge plate is positioned to within 0.005 millimeters of the orifice plate which supports the ink jet nozzles. A purge liquid is used to flush the ink jet nozzle until the ink streams are properly established. Thereafter the purge fluid is replaced with ink. The lower surface of the charge plate is plated with a nonwetting coating. The purge liquids which accumulate on the lower surface are dried by blowing air on said surface.

Other prior art techniques require the use of a wiping device for drying ink from the nozzle and/or electrodes. Still other prior art methods require the use of a cap or nozzle that move over the nozzle orifice at shut-down and/or start-up time. Detailed description of these techniques and methods are given in U.S. Pat. Nos. 3,945,020, 4,045,802 and IBM Technical Disclosure Bulletin Vol. 20, No. 2, July 1977, pgs. 786–788, and IBM Technical Disclosure Bulletin Vol. 18, No. 6, May 1976, pgs. 4138–4139.

Yet another technique used in the prior art to eliminate wetting of the electrode is disclosed in IBM Technical Disclosure Bulletin Vol. 18, No. 6, November 1975, pgs. 1813–1814. In the publication, the nozzles are aimed away from the charge and deflection electrodes at start-up and/or shut-down time.

SUMMARY OF THE INVENTION

It is therefore the main object of the present invention to improve the reliability of an ink jet printer by effectively containing the ink streams and/or ink droplets emanating from the print head at start-up and/or shut-down time.

The ink streams and/or ink droplets are controlled by providing a device which catches the ink until the print head is completely shut down or which catches the ink until the ink streams are fully established (start-up). The device includes a gutter and a positioning apparatus. The gutter is normally positioned at a predetermined distance downstream from the nozzle plate. At shut-down time the positioning apparatus transports the (same) gutter to a position immediately adjoining the nozzle plate. Thus, as the ink pressure is applied or removed the ink goes to the gutter. Once the ink streams are established, the gutter is moved along the flight path of the droplets to its initial (printing) position.

In one embodiment of the invention, the deflection electrode and the charge electrode are moved out of the path of the movable gutter as it advances to and from the nozzle plate.

In another embodiment of the invention, a charge is applied to all ink droplets. As the charged droplets pass through the deflection plates, the droplets are deflected into the movable gutter. The gutter is then moved along a path perpendicular to the droplet flight path from a first position to a second position whereby uncharged droplets may be caught in the gutter. The charge electrodes are then deactivated and the gutter is moved along the droplet's flight path towards the nozzle plate.

The foregoing and other objects, features and advantages of the invention will be apparent from the following description of a preferred embodiment of the invention, as illustrated in the accompanying drawings.

DETAILED DESCRIPTION OF THE PREFERRED EMBODIMENT

As used in this specification, the term Clean Start-up and Shut-down means that the functional components of the ink jet printer such as charge electrodes, deflection plates, etc. are not wetted by the ink and/or ink droplets at the time when the printer is stopped from operation or begins to operate.

Due to transient conditions associated with the drop generator at start-up and/or shut-down, a period of time is needed before the ink stream and/or streams are fully established. During this transient period, the ink tends to wet the deflection electrode and the charge electrode. The wetting results in electrical shortage and other problems (previously mentioned) with the head. The present invention alleviates the problem by transporting the lower deflection plate and the charge electrode from the vicinity of the droplets and positions the gutter at the nozzle plate to catch the ink during the unstable period of operation.

Figure 1:
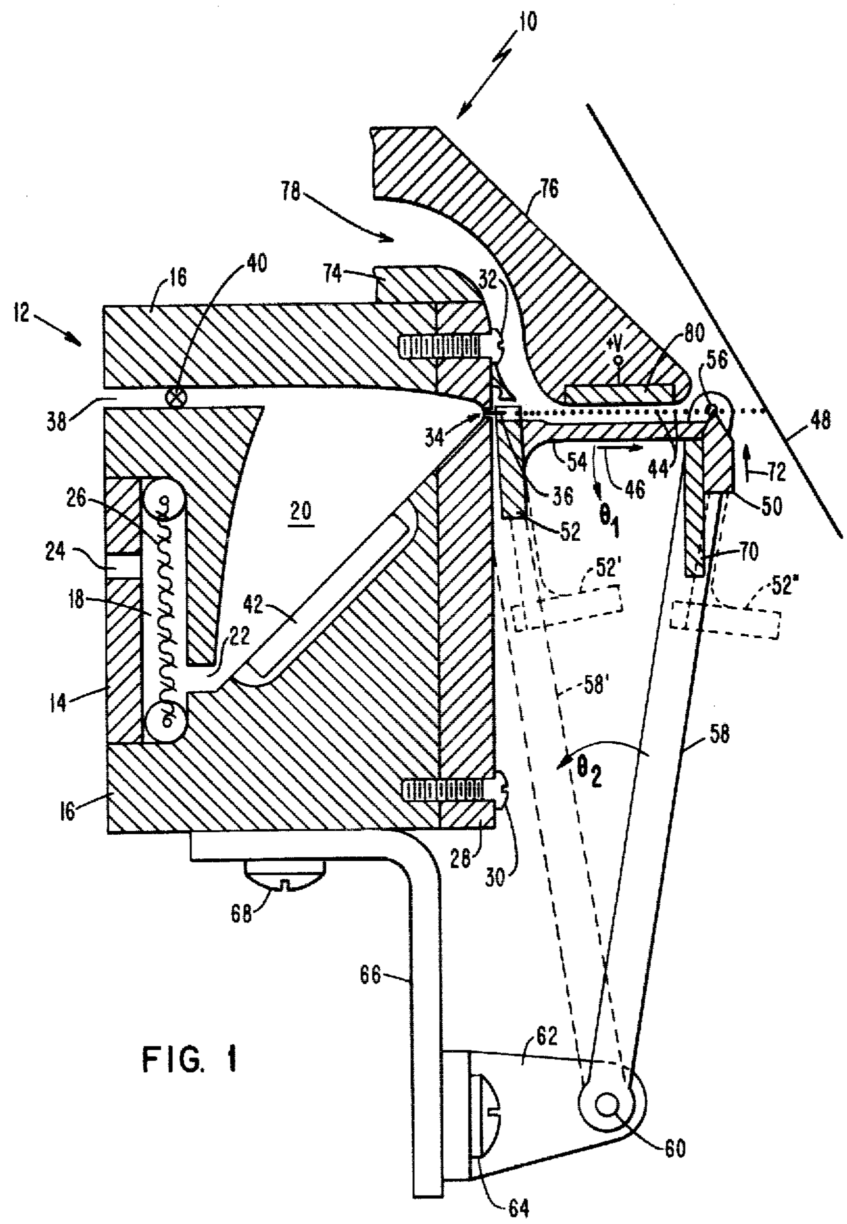
FIG. 1 shows a cross section of an ink jet printing head. The showing incorporates the teaching of the present invention.

Referring to FIG. 1, a sectional view of an ink jet printing head is shown generally at 10. The ink jet printing head includes a drop generator 12. The drop generator 12 is comprised of housing members 14 and 16 respectively. The housing members are arranged so as to define a two chamber cavity 18 and 20 respectively. Internal channel 22 interconnects cavities 18 and 20. Inlet passage 24 is connected to cavity 18. As will be explained subsequently, an electrically conductive fluid such as conductive ink is supplied under pressure from an external source (not shown) through inlet passage 24 to fill cavities 18 and 20. As the ink enters cavity 18 filter means 26 removes foreign particulate material from said ink. A nozzle plate 28 is mounted to housing member 16 using one of a plurality of means. In the preferred embodiment of the invention, the nozzle plate is mounted by screws 30 and 32 respectively. The nozzle plate is fitted with one or more orifices through which thread-like streams of ink are ejected. In the drawing only one orifice 34 is shown. Each of the orifices such as orifice 34 interconnects the outside face of the nozzle plate with cavity 20. Due to the minute size of the opening, a thread-like stream of ink such as stream 36 is ejected from the face of the nozzle plate. Of course, a plurality of openings can be disposed within the nozzle plate. Ink in cavity 20 may be removed through flush port 38. A valve 40 is positioned within the flush passage and controls the flow of ink therethrough. A vibrating means 42 is mounted to the side wall of cavity 20. In the preferred embodiment of the present invention the vibrating means is a piezoelectric crystal. When a periodic electrical wave form is applied to the crystal a pressure oscillation is created in the vicinity of orifice 34. As a result of this pressure oscillation, the thread-like stream and/or streams of ink such as stream 36 emanating from the orifice is broken up into a plurality of ink droplets 44 commencing in the vicinity of the face of the nozzle plate 28. The droplets are then propelled along a flight path parallel to the direction of arrow 46 to print on medium 48.

In order to place a charge on the droplets, a charge electrode 52 is positioned adjacent to nozzle plate 28. The charge electrode is fabricated with a plurality of channels, each channel is dedicated to charge droplets generated from a single nozzle. The position of the charge electrode relative to the nozzle plate is such that as droplets separate from the thread-like stream and/or streams a charge is induced on all or some of the droplets. It should be noted that instead of positioning the charge electrode below the ink stream (as is shown in FIG. 1) it may be positioned above the stream.

It is worthwhile noting at this point that there are two general methods for selecting drops used for printing on the media. In one method, the information on the media is printed by droplets which are not charged. More particularly, drops which are not needed for printing are charged by charge electrode 52 and are deflected into the gutter member 50. The second method of printing is the reverse of the first. In this method, charged drops are used for writing on the media while the uncharged drops are caught by the gutter. Although the present invention is applicable to either of the printing methods, it is particularly useful with ink jet systems which use the first method for printing. Therefore, in this specification, it will be assumed that the printing on media 48 is done by uncharged drops while charged drops are deflected into gutter 50.

Still referring to FIG. 1 the charge electrode 52 is connected to lower deflection plate 54. The deflection plate is pivotally mounted to shaft 56. Shaft 56 is fixed to one end of an elongated arm 58. The other end of the elongated shaft 58 is pivotally mounted to shaft 60. Shaft 60 is mounted to bracket 62 while bracket 62 is connected by screw 64 to an L-shaped bracket 66 which is mounted to drop generator 12 by screw 68. When activated, elongated arm 58 pivots about shaft 60 in a direction shown by $\theta_2$. The end of travel occurs when elongated arm 58 is in the position shown by broken line 58′. Prior to moving arm 58 in the direction of $\theta_2$, the charge electrode 52 and lower deflection plate 54 are moved in the direction shown by $\theta_1$. As elongated arm 58 travels towards the face of nozzle plate 28, the charge electrode and the lower deflection plate occupies the various positions shown by 52′ and 52″. When the elongated arm is in its final position at 58′, the charge electrode and its attached deflection plate is positioned at 52′. As such, when the elongated arm is in the position shown at 58′ the charge plate 52 and the lower deflection plate 54 are out of the vicinity of the flight path of the ink droplets. Prior to the movement of charge electrode 52 and the lower deflection plate 54, the gutter 50, which is slidably mounted to a transport bracket 70, is first moved in the direction shown by arrow 72. The gutter can now intercept undeflected droplets which are normally used for writing on media 48. Following motion $\theta_1$, the gutter is then transported towards the face of the nozzle plate and catch all inks generated from the orifices. It is worthwhile noting that if deflected drops are used for writing on the media then the upward motion of the gutter in the direction parallel to 72 need not occur. In other words, with the lower deflection plate and the charge electrode removed from the vicinity of the droplets, no charge is placed on said droplets, and the gutter is already in alignment to catch all droplets emanating from the orifice.

Still referring to FIG. 1 lower channel member 74 is mounted to housing member 16 and nozzle plate 28. An upper channel member 76 is positioned in spaced relationship with lower channel member 74. A wind tunnel or wind tunnels 78 is defined by the smooth surface of lower channel member 74 and upper channel member 76. The head is aspirated by allowing air to flow through channel 78 which reduces aerodynamic effect associated with the droplets as they are propelled along the flight path towards medium 48. An upper deflection plate 80 is fitted in the upper channel member 76 in spaced relationship to lower deflection plate 54. The upper deflection plate 80 and the lower deflection plate 54 coact to form the deflection electrode.

Figure 2:
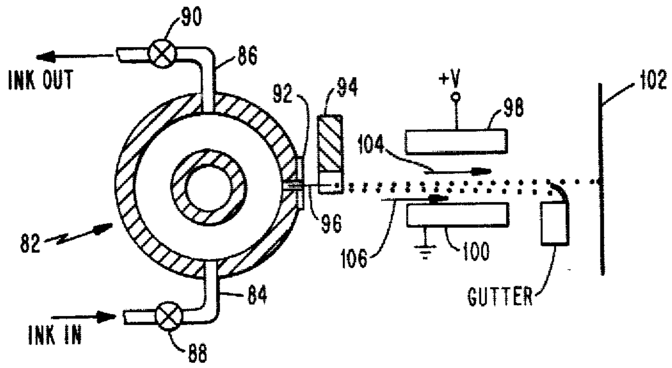
FIG. 2 shows a schematic of an ink jet printing head with the gutter located at its normal position in a "Run Mode."
Figure 3:
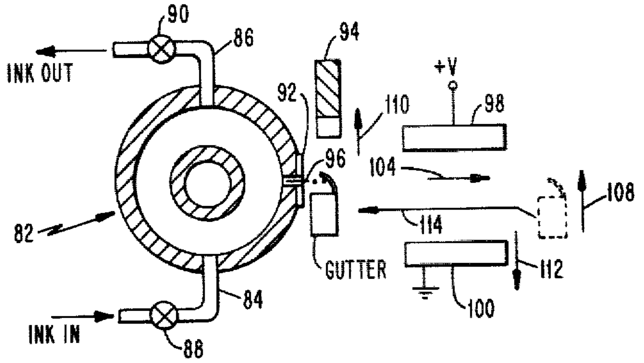
FIG. 3 shows a schematic of an ink jet printer with the gutter located at its transposed position to a start and/or stop position.

FIGS. 2 and 3 are a conceptual showing of the invention. In the figures, common elements are identified with the same numeral. In the conceptual showing, drop generator 82, which may be of a circular geometry as illustrated, is filled with a conductive ink. Ink is supplied to the head through conduit 84 while ink may be removed from the head through conduit 86. Inlet valve 88 controls the flow of ink into the head while outlet valve 90 controls the flow of ink out of the head. A nozzle plate 92 with one or more orifices is mounted to the head. A charge electrode 94 is positioned downstream from the nozzle plate and interacts with the streams to charge the droplets as they separate from the thread-like stream 96. A deflection electrode pair comprised of upper plate 98 and lower plate 100 is positioned downstream from the charge electrode. A paper path 102 is positioned downstream from the deflection plates. Droplets for writing on the paper follow path 104 while droplets which are not used for writing are deflected along path 106 into the gutter. When the ink jet printer is configured as the showing in FIG. 2, it is in the RUN MODE. In the RUN MODE the thread-like stream of ink 96 is broken up into droplets within the charge electrode 94. As the droplets separate from the stream, charges are selectively induced on them. In the preferred mode of operation, charged droplets are deflected into the gutter by the deflection plates 98 and 100 respectively or not deflected for writing on media 102.

FIG. 3 shows the ink jet printer in the start/stop mode. This mode is the NO RUN MODE. For explanation purposes it is assumed that the ink jet is about to be shut down from the RUN MODE shown in FIG. 2. It is further assumed that uncharged drops are used for writing on media 102. The charge electrode is energized so that all the drops are charged and are deflected along path 106 into the gutter. The gutter is moved up in the direction shown by arrow 108 to permit interception of droplets along flight path 104. The charge electrode 94 is de-energized and moved upwards in the direction shown by arrow 110 resulting in drops following path 104. The lower deflection plate 100 is moved down in the direction shown by arrow 112. The gutter is then transported in the direction shown by arrow 114 until it is within the immediate vicinity of the nozzle plate. As such, all ink which is misdirected at start-up and/or shut-down is caught in the gutter without wetting the charge electrode and/or the deflection electrode. As soon as the gutter reaches a predetermined distance from the nozzle plate the head is shut down. At start-up the gutter remains at the position shown in solid (that is within the vicinity of the print head) until the streams are fully established. The gutter is then transported in a direction opposite to arrow 114 until it is back at the position just above position shown by the broken line. The lower deflection plate 100 is then transported upwards to its normal position while the charge electrode is transported downwards to its normal position. Deflection voltages are then applied causing streams to follow path 106. The gutter is then moved downward to normal operational position. The ink jet printer is then reconfigured as is shown in FIG. 2 and is ready for normal printing.

In view of the above description the process steps associated with the present invention for shut-down may be summarized as follows:

Step 1: Apply a voltage to the charge electrode so that all generated droplets are guttered.

Step 2: Move the gutter upwards to intercept the flight path of noncharge droplets used for printing on the media.

Step 3: Deactivate the charge electrode and the deflection electrode by removing the voltage associated therewith.

Step 4: Remove the charge electrode and the deflection electrode from the immediate vicinity of the droplets flight path.

Step 5: Transport the gutter to the immediate vicinity of the nozzle plate to catch all ink emitted therefrom.

Step 6: Remove ink pressure.

For start-up the process steps are reversed. The process steps are as follows:

Step 7: Apply ink pressure. The gutter remains within the vicinity of the nozzle until the streams are fully established.

Step 8: The gutter is transported away from the nozzle plate until it reaches its normal operating position in the horizontal plane. At this point, there is no voltage on the drops and all are caught by the gutter.

Step 9: The charge electrode and lower deflection plate are then positioned within the vicinity of the streams.

Step 10: Voltage is applied to the charge electrode so that the streams are slightly deflected from the writing flight path 104 to the guttered flight path 106. Of course, all inks are still caught by the gutter.

Step 11: The gutter is then lowered so that the top clears the writing flight path thereby allowing normal operation.

It should be noted that at no time in the start or stop sequence was there a mechanical transition of the gutter edge across an active stream. This alleviates splashing due to this cause.

Figure 5:
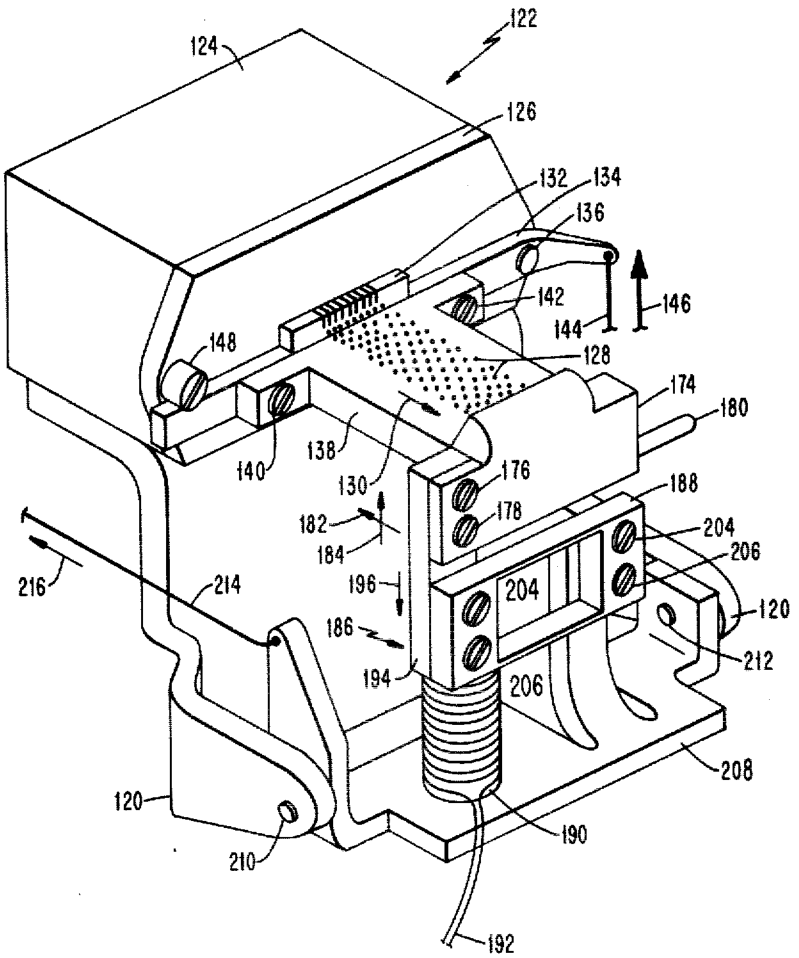
FIG. 5 shows a pictorial view of an ink jet printer head.

Referring now to FIG. 5 a pictorial view of an ink jet system according to the teaching of the present invention is shown. The ink jet system includes a mounting bracket 120. The mounting bracket supports various components of the ink jet system, each of which will be described hereinafter. A drop generator 122 is mounted to the mounting bracket. The print head includes a drop generator body 124 and a nozzle plate 126. The nozzle plate is firmly attached to the drop generator body. The drop generator body 124 contains a plurality of conventional ink jet components, such as a cavity for supporting the writing ink, and a crystal for vibrating the ink so as to generate a plurality of ink droplets 128. The ink droplets are propelled along parallel paths indicated by arrow 130, to write information on a length of recording medium (not shown). The nozzle plate 126 includes a plurality of orifices (not shown). As the crystal (not shown) in drop generator body 124 vibrates, a plurality of thread-like streams of ink (not shown) are emitted from the orifices in the nozzle plate. The thread-like streams of inks are broken up into the ink droplets within the vicinity of charge electrode 132. As the droplets are generated, an electrical charge is selectively induced on the droplets by the charge electrode.

The charge electrode is mounted to a support bracket 134. The support bracket is pivotally mounted at pivot point 136 to the nozzle plate. The lower deflection plate 138 is connected to the support bracket 134 by mounting screws 140 and 142, respectively. The support bracket 134, together with the lower deflection plate and the charge electrode, form a movable structure which rotates about pivot point 136 when a force is applied by link 144. The link 144 is connected to an actuator. When the actuator is in an active state, a force is applied to support bracket 134 in the direction opposite that shown by arrow 146. This force keeps the nozzle plate support bracket and its attachment, i.e., the charge electrodes and the lower deflection plate, within the vicinity of the nozzle plate. In this position, ink droplets which are emitted from the nozzle plate may be charged and deflected by the charge electrode and the lower deflection plate respectively. The upward movement of the support bracket 134 is stopped by eccentric upstop 148.

Figure 4:
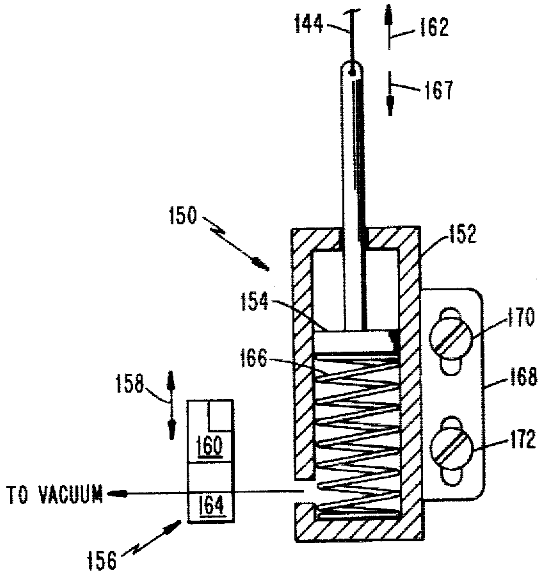
FIG. 4 shows, in more detail, a transducer for moving the charge electrode and lower deflection plate.

Referring now to FIG. 4 a first actuator 150 which controls the motion of the support bracket 134 and its attachment is shown. The actuator is connected by link 144 to the support bracket 134. In the preferred embodiment of the present invention, the actuator is a vacuum actuated piston. Of course, other types of actuators may be used by one skilled in the art without departing from the scope of the invention. The actuator includes a housing 152 in which a piston 154 is fitted. The housing 152 is fabricated with an opening. An electric two-positioned valve 156 is schematically illustrated in FIG. 4. The valve has motion in the direction shown by double-headed arrow 158. When section 160 of the valve is in alignment with the vacuum line, there is a controlled leakage from the actuator to the atmosphere. As such, the motion of the piston in the upward direction, shown by arrow 162, is at a controlled rate. This controlled upward motion of piston 154 is important so that when the piston is deactivated and moves upward, the support bracket 134 with its attachment, moves at a controlled speed which eliminates damage to the apparatus. In other words, when section 160 of the two-position valve is controlling air exchange to housing 152, the piston and its attachment move upward at a controlled rate.

To register the support bracket 134 against the eccentric upstop 148, the electric valve is transported in the direction shown by arrow 158 so that section 164 of the valve is now in alignment with the vacuum line. In this position vacuum draws the piston downward and via link 144 the support bracket 134 is locked firmly against the eccentric upstop. The piston 154 is biased by compression spring 166. The biasing is such that when the vacuum is not applied to the housing 154, the piston moves upward in the direction shown by arrow 162. As a result, the nozzle plate support bracket and its attachment will be removed from the flight path of the droplets and the nozzle plate. A mounting bracket 168 is attached to the housing and is mounted by fastening means 170 and 172 respectively.

Referring again to FIG. 5, the ink jet gutter 174 is positioned downstream from the charge electrode. The function of the ink jet gutter is to catch droplets which are not used for writing on a medium (not shown). According to the teaching of the present invention, the ink jet gutter is transported in at least two perpendicular directions (shown by arrows 182 and 184) to catch ink and prevent malfunction of the print head particularly at start-up and/or shut-down. The ink which is caught by the gutter is transported to an ink recirculation system (not shown) by channel means 180. As can be seen in FIG. 5, motion in the direction shown by arrow 184 is substantially perpendicular to the flight path of the ink droplets while motion in the direction shown by arrow 182 is substantially parallel to the flight path of the ink droplets.

The motion of the gutter in the direction shown by arrow 184 is supplied to the gutter by a second actuator 186. The second actuator includes a cardo spring 188 and a gutter electromagnet 190. The gutter electromagnet pulls the cardo spring downward while an electrical signal to the electromagnet is supplied on conductor 192. The cardo spring is fitted with an extension 194 to which the gutter is attached by mounting means 176 and 178 respectively.

Figure 7:
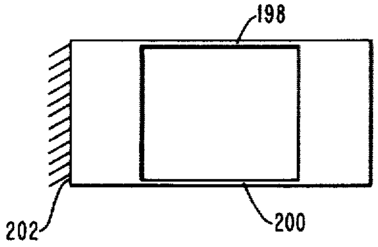
FIG. 7 shows a cardo spring in a relaxed state.
Figure 8:
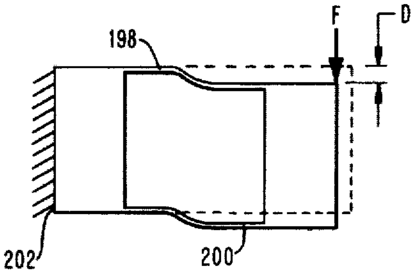
FIG. 8 shows the cardo spring in a deformed state.

Turning to FIGS. 7 and 8 for the moment, a plan view of the cardo spring is shown. The drawings in FIG. 7 and FIG. 8 are helpful in understanding the operation of the cardo spring and how the gutter is moved in the vertical plane in the direction parallel to arrow 196 (FIG. 5). The cardo spring includes a substantially rectangular piece of metal with an opening fabricated therein so as to define two thin legs 198 and 200 respectively. FIG. 7 shows the cardo spring in its relaxed state. Usually in application one side of the cardo spring such as side 202 is held firmly while the opposite side hereinafter called the free side, moves to create the necessary motion. FIG. 8 shows the cardo spring in its deformed configuration. As is obvious from FIG. 8 when a force (F) is applied to the free side of the cardo spring, the spring deforms a relatively small distance D. In FIG. 8 the relaxed or undeformed position of the cardo spring is shown in phantom lines while the deformed position is shown in solid lines. It should be noted in FIG. 8 that when the upper edge of the cardo spring is moved from its relaxed position to the deformed position, the edges are substantially parallel. As such, any device which is attached to the free side of the cardo spring will be translated along a substantially vertical path without a rotational component.

Referring now to FIG. 5, the force F which is applied to the free side of the cardo spring is supplied by the gutter electromagnet 190. Likewise the gutter is connected to the free end by mounting means 176 and 178 respectively. When a electrical signal is impressed on conductor 192, a force is imparted to the cardo spring which moves the spring with its attachment, to a first position in the direction shown by arrow 196. When the force is removed from the cardo spring, the spring relaxes and moves back in its normal position.

Still referring to FIG. 5, the cardo spring with its attachment is mounted by screws 204 and 206 to elongated gutter support bracket 208. The elongated gutter support bracket is pivotally mounted at points 210 and 212 to mounting bracket 120. As will be explained subsequently, when a force is applied to link 214 in the direction of arrow 216, the elongated gutter support bracket rotates about its pivot points and positions the gutter within the vicinity of nozzle plate 126.

Figure 6:
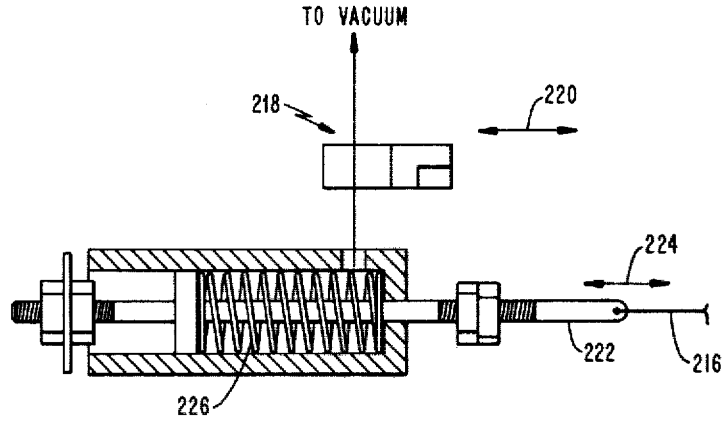
FIG. 6 shows a transducer for moving the gutter towards the nozzle plate.

Referring now to FIG. 6, the actuator which applies the force to link 214 and translates the gutter towards and away from the nozzle plate is shown. The actuator is a vacuum actuated cylinder and is similar to the air cylinder shown in FIG. 4 and previously described. This being the case the vacuum cylinder will not be described in detail. Suffice it to say that the two position electrical valve 218 is logically controlled to move in the direction shown by double headed arrow 220 and controls the rate of direction at which piston 222 is moved parallel to arrow 224. Return spring 226 biases the piston so that when the vacuum source (not shown) is inactive the gutter assembly is positioned within the vicinity of the nozzle plate.

One of the advantages which is derived from the above-described invention is that the gutter in moving in its vertical path or the horizontal path does not cut across the ink stream and therefore splashing of the ink is minimized.

What is claimed is:

1. An improved ink jet printer wherein noncharged ink droplets are used to write on a recording surface said printer comprising in combination:

a drop generator having a plurality of nozzles therein said drop generator being operable for generating a plurality of ink droplets for printing on a surface;

a movable charging electrode being positioned relative to said head and operable for charging the droplets emanating therefrom;

a deflection electrode disposed downstream from the charging electrode, said deflection electrode having a fixed and a movable deflection plate with the deflection plates being configured in spaced relation to straddle a path traversed by the ink droplets;

first means connected to said charging electrode and operable for moving the same;

an ink catching means positioned downstream from the movable electrode, said ink catching means being operable to move in two substantially orthogonal directions, one of said directions substantially perpendicular to a flight path being generated by the noncharged ink droplets and the other direction substantially parallel to the flight path of the noncharged ink droplets;

second means connected to the catching means and operable to move said catching means in the perpendicular direction; and third means connected to the catching means and operable to move the catching means in the parallel direction.

2. An improved ink jet printer having noncharged ink droplets for printing on a recording surface, said printer comprising in combination:

a support means;

a drop generator having one or more nozzles therein mounted to said support means, said drop generator being operable for generating a plurality of ink droplets for printing on a surface;

a charge electrode pivotally mounted to the drop generator and operable for charging the ink droplets emanating therefrom;

a deflection electrode positioned downstream from the charge electrode and operable to deflect the ink droplets, said deflection electrode including an upper deflection plate and a lower deflection plate with the lower deflection plate coupled to the charge electrode;

a first actuator means coupled to the charge electrode and operable to rotate said charge electrode relative to a flight path of the ink droplets;

an ink catching gutter positioned downstream from the deflection electrode, said ink catching gutter being operable to move in two substantially orthogonal directions;

a second actuator means operable to move the ink catching gutter in one of the substantially orthogonal directions, said one direction being perpendicular to the flight path of said noncharged ink droplets;

a gutter support bracket means pivotally mounted to the support means and coupled to the ink catching gutter; and third actuator means coupled to the gutter support bracket means and operable to rotate said gutter support bracket means whereby the ink catching gutter is moved along the other orthogonal direction substantially parallel to the flight path of the noncharged ink droplets.

3. The ink jet printer of claim 1 wherein the first and third actuator means are pneumatic.

* * * * *